United States Patent
He et al.

(10) Patent No.: US 9,781,582 B2
(45) Date of Patent: Oct. 3, 2017

(54) METHOD, DEVICE, AND SYSTEM FOR TRANSMITTING SHORT DATA DURING A CALL HANG TIME HOLD OFF PERIOD

(71) Applicant: MOTOROLA SOLUTIONS, INC, Chicago, IL (US)

(72) Inventors: Shu-Shan He, Chengdu (CN); Zheng Cao, Chengdu (CN); Meng-Ge Duan, Chengdu (CN); Huang Su, Chengdu (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/326,709

(22) PCT Filed: Aug. 29, 2014

(86) PCT No.: PCT/CN2014/085627
§ 371 (c)(1),
(2) Date: Jan. 17, 2017

(87) PCT Pub. No.: WO2016/029476
PCT Pub. Date: Mar. 3, 2016

(65) Prior Publication Data
US 2017/0208444 A1  Jul. 20, 2017

(51) Int. Cl.
*H04W 72/00* (2009.01)
*H04W 4/20* (2009.01)
(Continued)

(52) U.S. Cl.
CPC ............. *H04W 4/203* (2013.01); *H04W 4/10* (2013.01); *H04W 24/02* (2013.01)

(58) Field of Classification Search
CPC ....... H04W 24/02; H04W 4/10; H04W 4/203; H04W 4/20
(Continued)

(56) References Cited

U.S. PATENT DOCUMENTS 5,086,507 A * 2/1992 Mela ..................... H04W 84/08
455/509
5,850,611 A * 12/1998 Krebs ................. H04W 72/044
455/518
(Continued)

FOREIGN PATENT DOCUMENTS

CN    101656937 A    2/2010
EP    598888 B1    5/2000
(Continued)

OTHER PUBLICATIONS

The International Search Report and the Written Opinion, corresponding application No. PCT/CN2014/085627, filed: Aug. 29, 2014, all pages.

*Primary Examiner* — Nathan Taylor

(57) ABSTRACT

Short data is transmitted during a call hang time hold off period in a wireless communication system. During an active call on a voice channel, a radio controller detects deactivation of a push-to-talk (PTT) input at a transmitting mobile station (MS) via an uplink channel portion of the voice channel and identifies a particular MS in the wireless communication system in need to transmit short data. Responsively, the radio controller causes a call hang time hold off request to be transmitted via a downlink channel portion of the voice channel to all MSs in the active call instructing the mobile stations to delay call hang time during a call hang time hold off period. The radio controller then causes a short data transmission request to be sent to the particular MS instructing the particular MS to transmit inbound short data during the call hang time hold off period.

19 Claims, 8 Drawing Sheets

(51) Int. Cl.
*H04W 4/10* (2009.01)
*H04W 24/02* (2009.01)

(58) Field of Classification Search
USPC .................................. 455/418, 518, 413
See application file for complete search history.

(56) References Cited

U.S. PATENT DOCUMENTS

| | | | |
|---|---|---|---|
| 6,768,994 | B1 | 7/2004 | Howard et al. |
| 7,499,441 | B2 | 3/2009 | Wiatrowski et al. |
| 7,917,158 | B2 | 3/2011 | Sawada et al. |
| 8,493,897 | B2 | 7/2013 | Chang et al. |
| 8,570,970 | B2 | 10/2013 | Hsu et al. |
| 8,625,497 | B2 | 1/2014 | Stephens |
| 2002/0173327 | A1* | 11/2002 | Rosen .................. H04M 3/42 455/518 |
| 2003/0157945 | A1* | 8/2003 | Chen .................. H04W 68/005 455/458 |
| 2008/0013600 | A1* | 1/2008 | Fudally ............... H04W 76/005 375/136 |
| 2008/0144536 | A1 | 6/2008 | Razdan et al. |
| 2008/0207177 | A1* | 8/2008 | Shukla ................ H04W 76/005 455/413 |
| 2009/0137263 | A1 | 5/2009 | Abbate et al. |
| 2010/0048235 | A1* | 2/2010 | Dai ....................... G11B 27/105 455/518 |
| 2010/0298020 | A1* | 11/2010 | Dolgov ................ H04W 72/12 455/514 |
| 2012/0134352 | A1* | 5/2012 | Vu ....................... H04L 61/2053 370/347 |
| 2013/0322414 | A1 | 12/2013 | Chowdhary et al. |
| 2013/0322415 | A1 | 12/2013 | Chamarti et al. |
| 2014/0031019 | A1 | 1/2014 | Qi et al. |
| 2014/0066118 | A1* | 3/2014 | Pai ......................... H04W 4/10 455/518 |

FOREIGN PATENT DOCUMENTS

| | | | | |
|---|---|---|---|---|
| EP | 1304897 | A1 | 4/2003 | |
| GB | 2420252 | A | 5/2006 | |
| GB | 2420252 | B * | 9/2007 | .......... H04W 76/045 |
| GB | WO 2008040558 | * | 4/2008 | ............. H04W 4/10 |
| WO | 9967969 | A1 | 12/1999 | |

* cited by examiner

METHOD, DEVICE, AND SYSTEM FOR TRANSMITTING SHORT DATA DURING A CALL HANG TIME HOLD OFF PERIOD

This application is a National Stage filing under 35 USC §371 of co-pending Patent Cooperation Treaty international application having Serial No. PCT/CN14/85627 (the 'PCT international application') filed on Aug. 29, 2014. This application claims priority to the PCT international application, the entire contents of which are incorporated herein by reference.

BACKGROUND OF THE INVENTION

Wireless communication systems provide for radio communication links to be arranged within the system between a plurality of user terminals. Such user terminals may be mobile and may therefore be known as mobile stations.' At least one other terminal, e.g. used in conjunction with mobile stations, may be a fixed terminal, e.g. a control terminal, base station, or access point. Such a system typically includes a system infrastructure which generally includes a network of various fixed installations such as base stations, which are in direct radio communication with the mobile stations. Each of the base stations operating in the system may have one or more transceivers which may, for example, serve mobile stations in a given local region or area, known as a 'cell' or 'site', by radio frequency (RF) communication. The mobile stations which are in direct communication with a particular base station are said to be served by the base station, and all radio communications to and from each mobile station within the system are made via respective serving base stations. Sites of neighbouring base stations in a wireless communication system may be offset from one another or may be overlapping.

Wireless communication systems may operate according to an industry standard land mobile radio (LMR) protocol such as, for example, the Project 25 (P25) standard defined by the Association of Public Safety Communications Officials International (APCO), the Digital Mobile Radio (DMR) standard, or other radio protocols. Communications in accordance with DMR, P25, or other standards may take place over physical channels in accordance with one or more of a TDMA (time division multiple access) protocol, a FDMA (frequency divisional multiple access), or CDMA (code division multiple access) protocol. Mobile stations in wireless communication systems such as DMR systems send and receive user communicated voice data (e.g., voice or audio alone or multiplexed with other data such as video or image data) and non-voice data (e.g., location data or sensor data, control signalling, etc.), herein referred to collectively as 'traffic information', in accordance with the designated protocol.

Furthermore, LMR systems may operate in either a conventional or trunked configuration. In either configuration, a plurality of mobile stations may be partitioned into separate groups of mobile stations, such that mobile stations may selectively participate in individual (mobile station to mobile station) calls and also in group (mobile station to many mobile stations) calls.

In a conventional system, each mobile station in a group is selected to a particular FDMA frequency for communications associated with that mobile station's group. Thus, each group is served by one frequency (e.g., channel), and multiple groups may share the same single frequency (in which case, in some embodiments, group IDs may be present in the group data to distinguish between groups using the same shared frequency). In some systems, each conventional frequency may be further configured to carry multiple channels via a TDMA protocol, which allows for multiple concurrent calls on each frequency based on the configured ratio of the TDMA channels.

In contrast, a trunked radio system and its mobile stations use a pool of traffic channels (e.g., FDMA or TDMA protocols operating on a plurality of available physical frequencies) for virtually an unlimited number of groups of mobile stations (e.g., talkgroups). Thus, all groups are served by all channels. The trunked radio system works to take advantage of the probability that not all groups need a traffic channel for communication at the same time. When a member of a group requests a call on a control or rest channel on which all of the mobile stations in the system idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the mobile stations were idling to a traffic channel for the call, and instruct all mobile stations that are not participating in the new call to move to a newly assigned control or rest channel selected from the pool of available channels. With a given number of channels, a much greater number of groups can be accommodated in a trunked system as compared with conventional radio systems.

Group members for group calls conducted on conventional or trunked systems may be statically or dynamically defined. That is, in a first example, a user or administrator working on behalf of the user may indicate to the switching and/or radio network (perhaps at a call controller, push-to-talk (PTT) server, zone controller, or mobile management entity (MME), base station controller (BSC), mobile switching center (MSC), site controller, Push-to-Talk controller, or other network device) a list of participants of a group at the time of the call or in advance of the call. The group members (e.g., mobile stations) could be provisioned in the network by the user or an agent, and then provided some form of group identity, identifier, or address, for example. Then, at a future time, an originating user in a group may cause some signalling to be transmitted indicating that he or she wishes to establish a communication session (e.g., group call) with each of the pre-designated participants in the defined group. In another example, mobile stations may dynamically affiliate with a group (and also disassociate with the group) perhaps based on user input, and the switching and/or radio network may track group membership and route new group calls according to the current group membership.

Many wireless communication systems, including many LMR systems, provide for non-voice data transmission capabilities on a same traffic channel as voice communications or on one or more separate data revert channels. Data transmission capabilities may be used to periodically or semi-periodically (e.g., intermittently) report location information of mobile stations, determined via a GPS system, triangulation process, or some other method, or to periodically or semi-periodically report other types of data such as sensor information. Reported sensor information may include environmental conditions surrounding the mobile station, or health conditions (e.g., pulse rate, temperature, oxygen level, breath rate, etc.) of the mobile station's user, among many other possibilities. Such location and sensor information is usually short in nature (e.g., does not require a large amount of bandwidth to transmit, and can normally be transmitted in under one second), but is reported in a periodic or semi-periodic manner so that infrastructure applications, devices, and/or dispatchers can be provided with updated information over time. Other types of periodic and semi-periodic information may be transmitted as well.

As the number of applications that utilize or depend upon such periodic or semi-periodic data transmissions grow, the amount and frequency of such transmissions has grown as well. One problem that has arisen with respect to the periodic or semi-periodic transmission of non-voice data from mobile stations during group or individual calls is that calls having an excessive duration impair the ability of any one particular mobile station participating in the call from reporting such periodic or semi-periodic data. In other words, while a particular mobile station is participating in voice activity (e.g., transmitting and/or receiving voice data to and/or from one or more other mobile stations) it is unable to transmit the periodic or semi-periodic non-voice data. As a result, applications, devices, and/or dispatchers in the infrastructure relying upon the transmissions are starved of data, which could lead to negative consequences, especially in first responder wireless communications systems. One solution to the problem may be to provide a second transceiver in each mobile station and a second dedicated wireless channel on which to transmit such periodic or semi-periodic data. However, implementing a second transceiver and associated additional wireless channels substantially increases costs associated with implementing the supporting wireless communications system.

Accordingly, what is needed is an improved method, device, and system for transmitting short data in a wireless communication system.

DETAILED DESCRIPTION OF THE INVENTION

Figure 1:
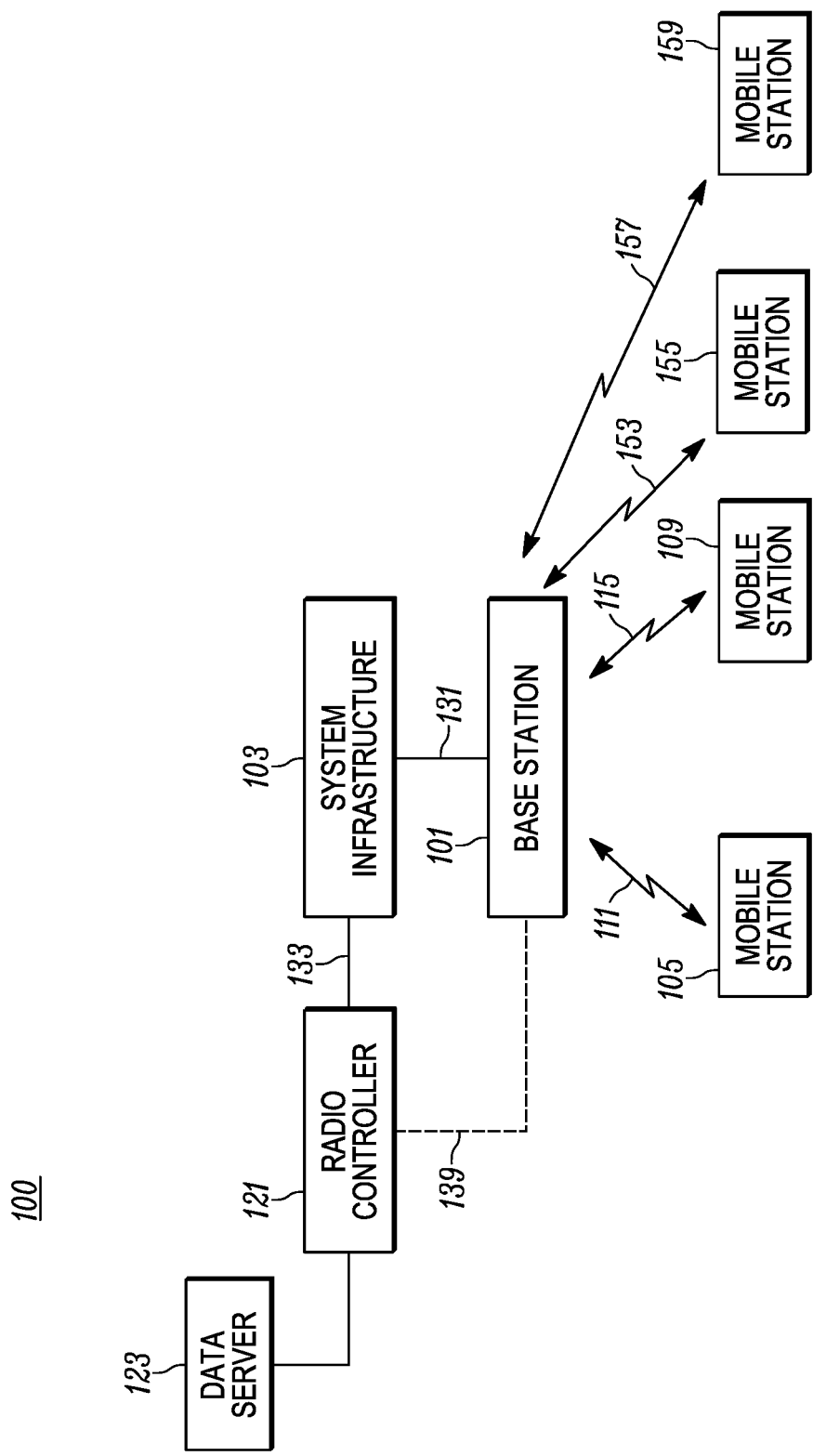
FIG. 1 is a schematic diagram of a wireless communication system in accordance with an embodiment.

Disclosed is an improved an improved method, device, and system for transmitting short data during a call hang time hold off period in a wireless communication system.

In one embodiment, a method of transmitting short data during a call hang time hold off period in a wireless communication system includes: during an active call on a voice channel, detecting, at a radio controller, deactivation of a push-to-talk (PTT) input at a transmitting mobile station via an uplink channel portion of the voice channel, identifying a particular mobile station in the wireless communication system in need to transmit short data, and responsively; causing, by the radio controller, a call hang time hold off request to be transmitted via a downlink channel portion of the voice channel to all mobile stations in the active call instructing the mobile stations to delay call hang time for the active call during a call hang time hold off period; and causing, by the radio controller, a short data transmission request to be sent to the particular mobile station instructing the particular mobile station to transmit inbound short data during the call hang time hold off period.

In another embodiment, a radio controller in a radio network comprises: a transceiver; a processor; and a computer readable medium having instructions stored thereon that, in response to execution by the processor, cause the radio controller to perform operations comprising: during an active call on a voice channel, detecting deactivation of a push-to-talk (PTT) input at a transmitting mobile station via an uplink channel portion of the voice channel, identifying a particular mobile station in the wireless communication system in need to transmit short data, and responsively: causing, via the transceiver, a call hang time hold off request to be transmitted via a downlink channel portion of the voice channel to all mobile stations in the active call instructing the mobile stations to delay call hang time for the active call during a call hang time hold off period; and causing, via the transceiver, a short data transmission request to be sent to the particular mobile station instructing the particular mobile station to transmit inbound short data during the call hang time hold off period.

In a still further embodiment, a mobile station in a wireless communication system comprises: a transceiver; a push-to-talk (PTT) input; a display; a speaker; a microphone; a processor; and a computer readable medium having instructions stored thereon that, in response to execution by the processor, cause the mobile station to perform a set of operations comprising: during an active call on a voice channel, receiving, via the transceiver and a downlink channel portion of the voice channel, a call hang time hold off request instructing mobile stations participating in the active call to delay call hang time for the active call during a call hang time hold off period; during the call hang time hold off period, refraining from acting upon any detected activation of the PTT input; subsequently receiving, via the transceiver and a downlink channel portion of the voice channel, a normal call hang time resume message sent to all mobile stations in the active call instructing the mobile stations to refrain from further delaying call hang time for the active call; and responsive to detecting an activation of the PTT input during call hang time after receiving the normal call hang time resume message, transmitting, via an uplink channel portion of the voice channel, a request to transmit.

Each of the above-mentioned embodiments will be discussed in more detail below, starting with example network and device architectures of systems in which the embodiments may be practiced, followed by a discussion of call hang time hold off period short data transmission processes from a system perspective, including in particular, processes executed at a radio controller and mobile stations of the wireless communication system. Further advantages and features consistent with this disclosure will be set forth in the following detailed description, with reference to the figures.

I. NETWORK AND DEVICE ARCHITECTURE

FIG. 1 shows a wireless radio communication system 100 that may be adapted in accordance with an embodiment of the disclosure. It will be apparent to those skilled in the art that the system 100 and the components that are to be described as operating therein may take a number of forms well known to those skilled in the art. Thus, the layout of the system 100, and of its operational components to be described, should be regarded as illustrative rather than limiting. The system 100 of FIG. 1 will be described as an illustrative wireless communication system such as a system capable of operating in accordance with the P25 standard and/or the DMR standard, but may be equally applied to other currently known and/or future standards protocols.

The system 100 shown in FIG. 1 includes one or more base stations 101 operably connected to a system infrastructure 103 via respective wired or wireless links 131. As used herein, the term "base station" (BS) refers to any entity that includes a transmitter and/or receiver to perform the functionality of receiving traffic information from a signal source (e.g. initiating/transmitting mobile station 105) and transmitting some or all of the traffic information to one or more signal destinations (e.g, mobile station 109, mobile station 155, mobile station 159, system infrastructure 103, etc.). For example, the BS 101 may comprise, among other possibilities, a cellular wireless base station, a two-way radio repeater, an IEEE 802-based wireless access points, or other similar devices.

The BS 101 has radio links with a plurality of mobile stations (MSs), particularly MSs in a service cell or site at least partially defined by a geographic location of the BS 101. In addition, BS 101 may maintain a direct wireless or wired link 139 (or indirect link via system infrastructure 103) with a radio controller 121 or other radio network communications device (such as a zone controller). While the radio controller 121 is illustrated as a separate entity in the system 100, in other embodiments, the radio controller 121 may be integrated with other devices (such as a zone controller) in system infrastructure 103 and/or with BS 101. The radio controller 121 may further be configured to provide registration, authentication, encryption, routing, and/or other services to BS 101 so that MSs operating within its coverage area may communicate with other MSs in the system 100. The radio controller 121 may also track or have access to group subscription information that, for each group identifier associated with a particular group of radios (e.g., talkgroup), identifies MSs (e.g., by hardware ID, hardware MAC address, IP address, radio ID, International Mobile Subscriber Identity (IMSI), a serial number, or some other unique identifier that can be used to identify subscribed member MSs) that are members of the particular group of radios.

Still further, radio controller 121 may track priority information associated with each MS in a group of MSs, perhaps pre-set by a system administrator or installer, or dynamically adjustable via administrative access from MSs or dispatch consoles in the system 100, that relatively ranks a priority of each MS in a group relative to one another. Additionally or alternatively, the radio controller 121 may also track or have access to a data server 123. Other types of information could be tracked or made accessible to radio controller 121 as well.

Four MSs 105, 109, 155, 159 are illustrated in FIG. 1 as being within the service area of, and being registered with, BS 101 via respective radio links 111, 115, 153, 157. The radio links 111, 115, 153, 157 may operate according to a conventional or trunked FDMA or TDMA LMR protocol, for example, or some other air-interface protocol. The radio links 111, 115, 153, 157 may represent separate physical or logical channels or a single physical or logical multicast or broadcast channel, and each channel may comprise a channel set including an uplink channel portion and a downlink channel portion separated by time, frequency, or code. The BS 101 thereby serves MSs including the MSs 111, 115, 153, 157 with radio communications to and from other terminals, including (i) MSs served by the BS 101, (ii) MSs served by other BSs (not shown), (iii) other terminals including MSs in other systems (not shown) operably linked to the system 100 via the system infrastructure 103, and (iv) a console (not shown).

The system infrastructure 103 includes known sub-systems required for operation of the system 100. Such sub-systems may include, for example, sub-systems providing additional authentication, routing, registration, location, system management, encryption, and other operational functions within the system 100. The system infrastructure 103 may also provide routes to other BSs providing cells serving other MSs, and/or may provide access to other external types of networks such as the plain old telephone system (POTS) network or a data-switched network such as the Internet. The system infrastructure 103 may also maintain a separate link 133 to the radio controller 121.

Data server 123 may be a storage device and/or application server that stores and/or otherwise processes data provided by MSs, such as location data or sensor data. Data stored at the data server 123 may be made available (before or after further processing executed at the data server 123) at a display directly coupled to the data server 123, at MSs in the system 100, or at a console device otherwise coupled to the system infrastructure 103, among other possibilities. While the data server 123 is illustrated as a separate entity in the system 100, in other embodiments, the data server 123 may be integrated with other devices in the system 100 such as the radio controller 121, other devices in the system infrastructure 103 such as a zone controller, and/or may otherwise be accessible via one or more of the external types of networks noted above.

Figure 2:
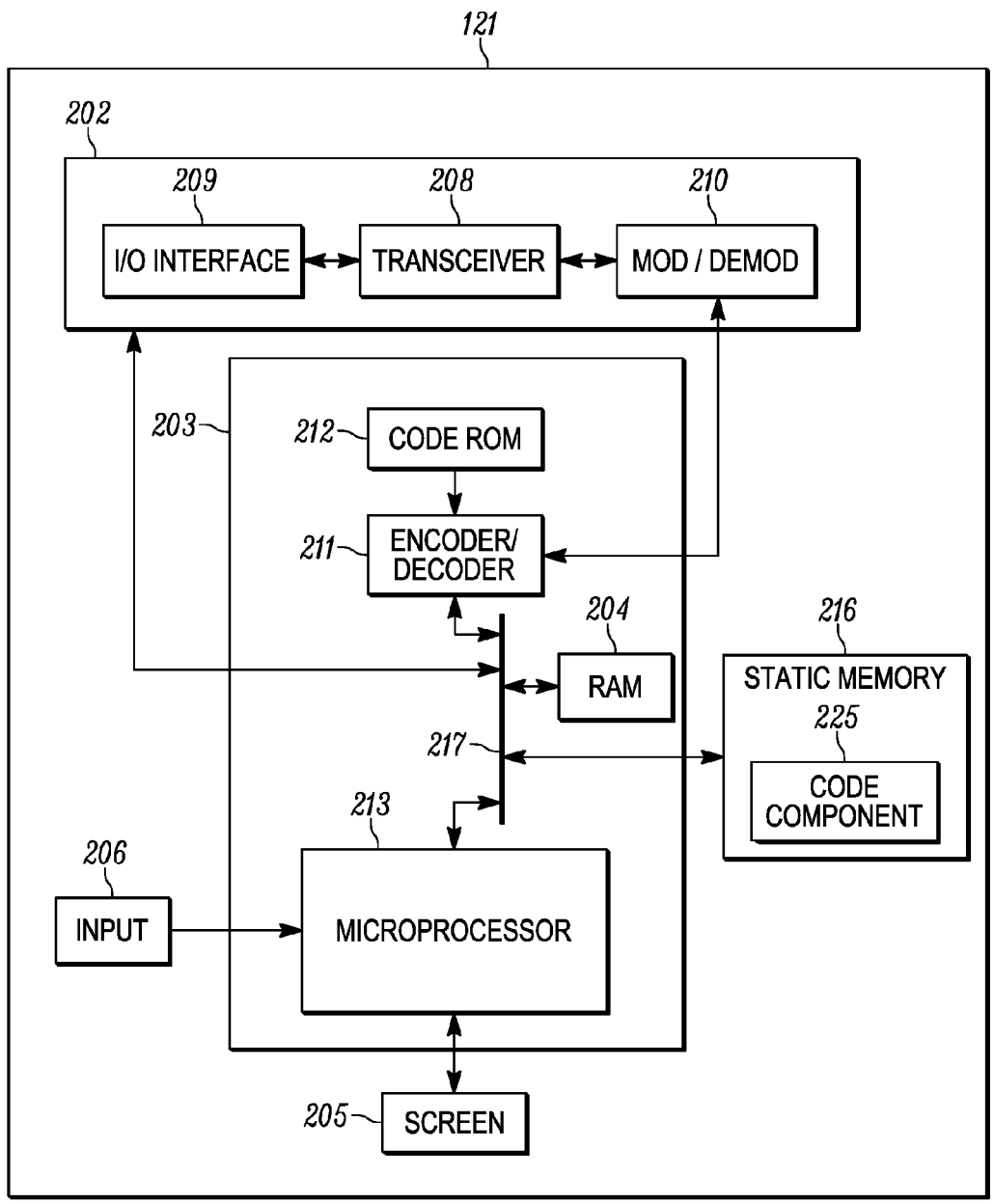
FIG. 2 is a block diagram of an illustrative layout of a radio controller of the system of FIG. 1 in accordance with an embodiment.

FIG. 2 is an example functional block diagram of a radio controller 121 operating within the system 100 of FIG. 1 in accordance with some embodiments. As shown in FIG. 2, radio controller 121 includes a communications unit 202 coupled to a common data and address bus 217 of a processing unit 203. The radio controller 121 may also include an input unit (e.g., keypad, pointing device, etc.) 206 and a display screen 205, each coupled to be in communication with the processing unit 203.

The processing unit 203 may include an encoder/decoder 211 with an associated code Read Only Memory (ROM) 212 for storing data for initializing system components, and encoding and/or decoding voice, data, control, or other signals that may be transmitted or received between the radio controller and BSs or MSs in the system 100. The processing unit 203 may further include a microprocessor 213 coupled, by the common data and address bus 217, to the encoder/decoder 211, a Random Access Memory (RAM) 204, and a static memory 216.

The communications unit 202 may include one or more wired or wireless input/output (I/O) interfaces 209 that are configurable to communicate with MSs such as MSs 105, 109, with BSs such as BS 101, and/or with other devices in or communicably coupled to the system infrastructure 103.

The communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless radio network. The communications unit 202 may additionally include one or more wireline transceivers 208, such as an Ethernet transceiver, a Universal Serial Bus (USB) transceiver, or similar transceiver configurable to communicate via a twisted pair wire, a coaxial cable, a fiber-optic link or a similar physical connection to a wireline network. The transceiver 208 is also coupled to a combined modulator/demodulator 210 that is coupled to the encoder/decoder 211.

The microprocessor 213 has ports for coupling to the input unit 206 and to the display screen 205. Static memory 216 may store operating code for the microprocessor 213 that, when executed, performs one or more of the processing, transmitting, and/or receiving steps set forth in FIG. 6 and its accompanying text. Static memory 216 may also store, permanently or temporarily, group subscription information that, for each group identifier associated with a particular group of MSs, identifies MSs that are members of the particular group. Additionally or alternatively, static memory 216 may also store, permanently or temporarily, priority information associated with each group identifier that relatively ranks a priority of each MS in a group relative to one another. Other types of information could be tracked and/or stored in static memory 216 as well.

Static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, to name a few.

Figure 3:
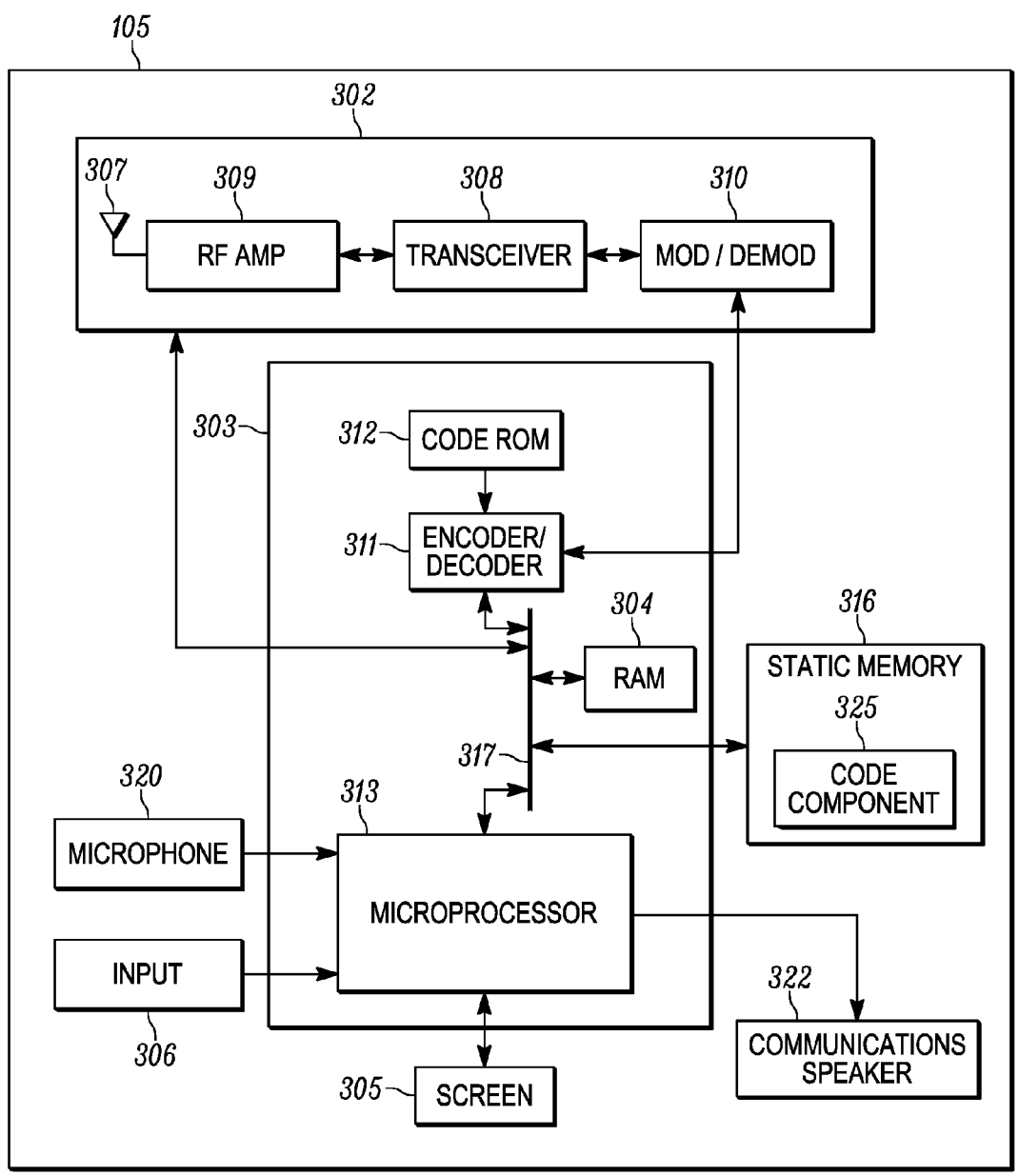
FIG. 3 is a block diagram of an illustrative layout of a mobile station of the system of FIG. 1 in accordance with an embodiment.

FIG. 3 is an example functional block diagram of a MS such as MS 105 operating within the system 100 of FIG. 1 in accordance with some embodiments. Other MSs such as MSs 109, 155, and 159 may contain same or similar structures. As shown in FIG. 3, MS 105 comprises a radio frequency communications unit 302 coupled to a common data and address bus 317 of a processing unit 303. The MS 105 may also include an input 306 and a display screen 305, each coupled to be in communication with processing unit 303. A microphone 320 captures audio from a user that is further vocoded by processing unit 303 and transmitted as voice data by communication unit 302 to other MSs or the infrastructure. A communications speaker 322 reproduces audio that is decoded from voice data transmissions received from other MSs via the communications unit 302.

The processing unit 303 may also include an encoder/decoder 311 with an associated code Read Only Memory (ROM) 312 for storing data for initializing system components and encoding and/or decoding voice or other traffic information that may be transmitted or received by the MS 105. The processing unit 303 may further include a microprocessor 313 coupled, by the common data and address bus 317, to the encoder/decoder 311, a Random Access Memory (RAM) 304, and a static memory 316.

The radio frequency communications unit 302 is a combined receiver and transmitter (e.g., transceiver) having a common antenna 307. The radio frequency communications unit 302 has a transceiver 308 coupled to the antenna 307 via a radio frequency amplifier 309. The transceiver 308 may be a transceiver operating in accordance with one or more standard protocols, such as a DMR transceiver, a P25 transceiver, a TETRA transceiver, a Bluetooth transceiver, an LTE transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless network. The transceiver 308 is also coupled to a combined modulator/demodulator 310 that is coupled to the encoder/decoder 311.

The microprocessor 313 has ports for coupling to the input 306 and to the display screen 305. The microprocessor 313 further has ports for coupling to the microphone 320 and to the speaker 322. In some embodiments of the present disclosure, the static memory 316 may store operating code for the microprocessor 313 that, when executed by the microprocessor 313, perform one or more of the MS processing, transmitting, and/or receiving steps set forth in FIGS. 6 and 8 and accompanying text. Static memory 316 may comprise, for example, a HDD, an optical disk drives such as a CD drive or DVD drive, a SSD, a tape drive, a flash memory drive, or a tape drive, to name a few.

II. PROCESS OF TRANSMITTING SHORT DATA DURING CALL HANG TIME HOLD OFF

Figure 4:
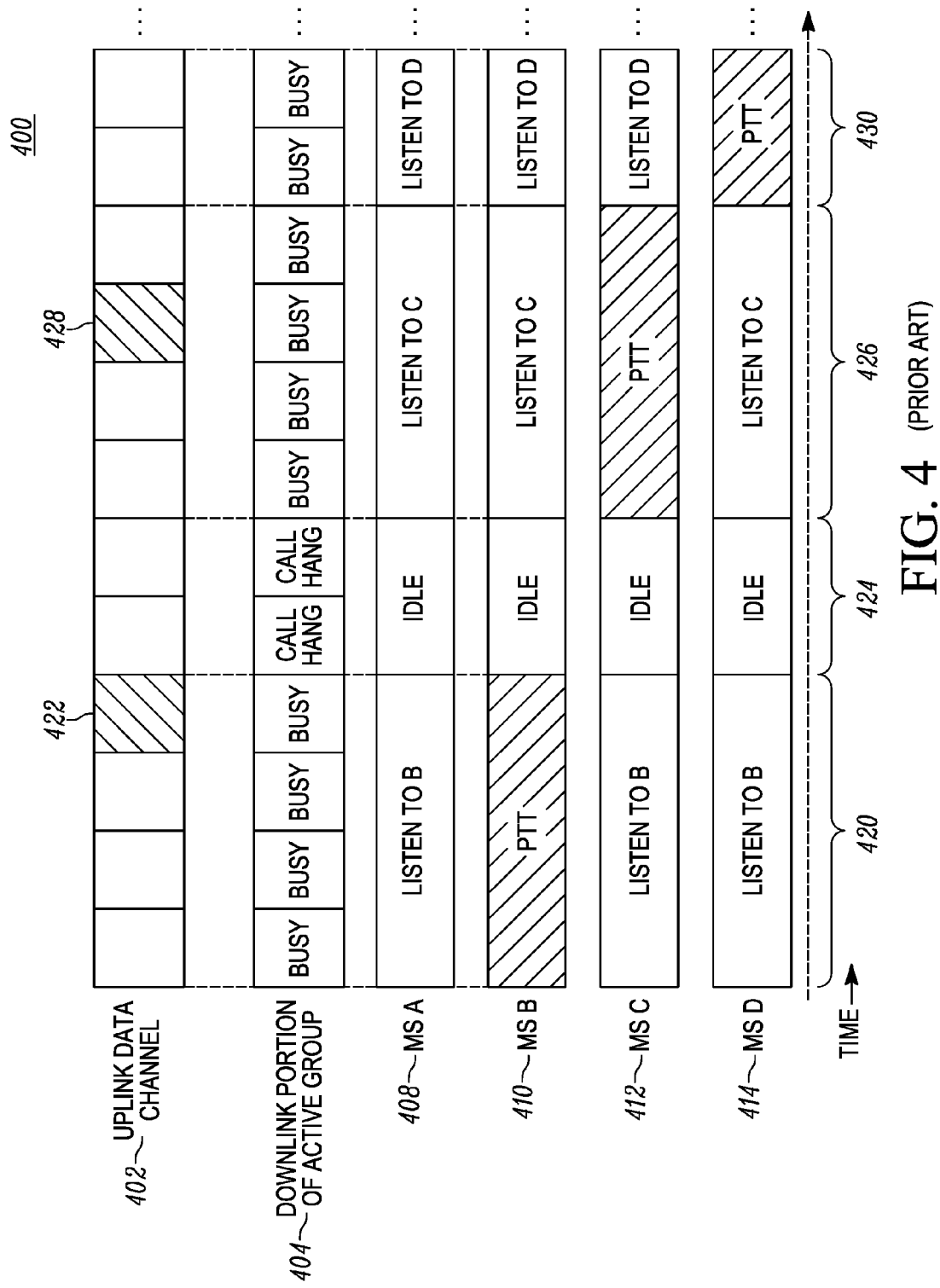
FIG. 4 is a timing diagram of a conventional process for transmitting short data in a wireless communication system.
Figure 5:
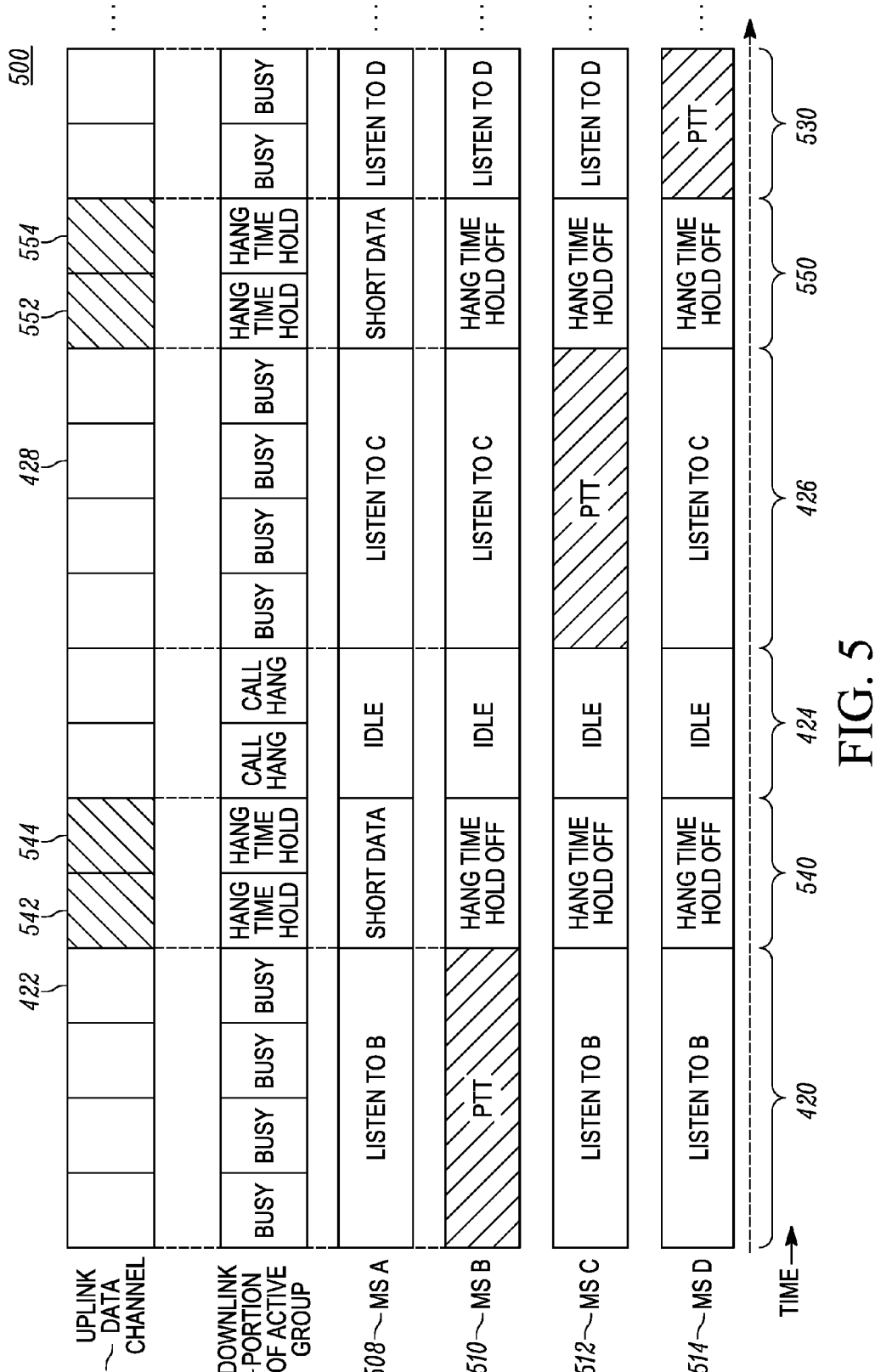
FIG. 5 is a timing diagram of a process for transmitting short data in accordance with an embodiment.

As set forth above, some conventional group call scenarios may experience an excessive amount of voice activity that may impair an ability of MSs participating in the call to report periodic or semi-periodic short data. FIG. 4 sets forth an example timing diagram 400 illustrating this impairment during an example active group call in a conventional system. FIG. 5 sets forth an example timing diagram 500 consistent with this disclosure. While FIGS. 4 and 5 illustrate a group call scenario, similar considerations apply equally as well to individual call scenarios. Further, while FIGS. 4 and 5 illustrate TDMA channels in a wireless communication system, similar considerations apply equally as well to FDMA channels.

In FIG. 4, time progresses left to right with respect to an uplink data channel 402 is illustrated at the top, a downlink channel portion of an active group voice channel 404 carrying voice data for the call is illustrated below that, and activity states of four MSs MS A 408, MS B 410, MS C 412, and MS D 414 that are part of a single group are illustrated below that. In this example, MSs A-D 408-414 are operating in a same wireless coverage area of a same serving BS, and the uplink data channel 402 is a dedicated uplink data channel separate from uplink or downlink channel portions of the active group voice channel assigned to the active group call.

As illustrated in FIG. 4, during time period 420 of an already-established active group voice call, MS B 410 has its PTT input activated and is transmitting voice data to the group on an uplink channel portion of the active group voice channel (only the downlink channel portion of which is shown in FIG. 4), and MSs A 408, C 412, and D 414 are all in a receive mode and receive the voice data transmitted by MS B 410 on the downlink channel portion of the active group voice channel 404 (accordingly identified as 'busy' during time period 420), decode the voice data, and playback corresponding audio (accordingly identified as in a "Listen to B" state during time period 420).

Periodic or semi-periodic opportunities 422 and 428 for MS A 408 to transmit short data on the uplink data channel 402 are illustrated in a shaded manner in FIG. 4. These opportunities may have been previously assigned to MS A 408 by a radio controller or other device in the infrastructure, preconfigured at MS A 408 or manually or automatically generated at MS A 408, or may otherwise generally represent missed opportunistic chances to transmit short data on the uplink data channel 402. As shown in FIG. 4, MS A 408 cannot move to the uplink data channel 402 during the time period 420 or it would miss the portion of the voice data being transmitted by MS B 410 (and repeated on the downlink channel portion of the active group voice channel by a BS), and thus MS A 408 misses the first periodic or semi-periodic opportunity 422 to transmit short data.

Next, a user of MS B 410 releases or otherwise deactivates the PTT input and transmits an indication of the release on the uplink channel portion of the active group voice channel, and as a result, the call enters a call hang time period during time period 424. Call hang time is a time period in which the active group voice channel (uplink and downlink channel portions) is no longer being used by (e.g., is not carrying voice data for) any of the MSs that were in the active group, but during which is reserved for a threshold period of time for use only by the MSs that were in the active group to end the call hang time and start transmitting. In other words, the call hang time preserves the voice channel that was assigned to the group call for other MSs to 'reply' to the last transmitting MS in the group. A period of time reserved as call hang time may be in the range of 0.5 to 10 seconds, and in many instances, is in the range of 1-4 seconds. During the call hang time, the previously transmitting MS B 410 switches its transceiver from transmitting on the uplink channel portion of the assigned active group voice channel to receiving on the downlink channel portion of the active group voice channel in order to listen for other MSs in the group that decide to key up and transmit a reply, among other purposes. As illustrated in FIG. 4, MS A 408, MS B 410, MS C 412, and MS D 414 are all indicated as IDLE during time period 424, and the downlink channel portion of the active group voice channel 404 is illustrated as remaining in a call hang time state. MS B 410 cannot switch to the uplink data channel 402 during the call hang time state of time period 424 or it might miss another MS in the group that keys up to reply, resulting in an audio hole at MS B 410, among other possibly missed signalling.

At the beginning of time period 426, MS C 412 detects activation of its PTT input and switches to the uplink channel portion of the active group voice channel and begins transmitting to the group, effectively ending the call hang time period. As during time period 420, the voice data transmitted by MS C 412 is repeated via its serving BS on the downlink channel portion of the active group voice channel 404, and MSs A 408, B 410, and D 414 are accordingly illustrated as in a "Listen to C" state and receive the voice data over the channel 404, decode the voice data, and play back corresponding audio. The downlink channel portion of the active group voice channel 404 is again illustrated as 'busy' during time period 426. As shown in FIG. 4, MS A 408 again cannot move to the uplink data channel 402 during the time period 426 or it would miss the portion of the voice data being transmitted by MS C 412, and thus MS A 408 misses the second periodic or semi-periodic opportunity 428 to transmit short data.

Next, the user of MS C 412 releases or otherwise deactivates the PTT input, and the call enters a call hang time period that is not shown in FIG. 4 as a user of MS D 414 substantially immediately activates its PTT input and MS D 414 switches to the uplink channel portion of the active group voice channel and begins transmitting to the group during time period 430, effectively ending the call hang time period too small to illustrate in FIG. 4. As during time period 420, the voice data transmitted by MS D 414 is repeated via its serving BS on the downlink channel portion of the active group voice channel 404, and MSs A 408, B 410, and C 412 are accordingly illustrated as in a "Listen to D" state and receive the voice data over the channel 404, decode the voice data, and play back corresponding audio. The downlink channel portion of the active group voice channel 404 is again illustrated as 'busy' during time period 430.

FIG. 5 sets forth a timing diagram illustrating an example of a proposed solution to the impairment of FIG. 4 during a second example active group call in a system according to an embodiment. In FIG. 5, time again progresses left to right with respect to an uplink data channel 502 illustrated at the top, a downlink channel portion of an active group voice channel 504 illustrated below that, and activity of four MSs A 508, B 510, C 512, and D 514 that are part of a second single group illustrated below that. In this example, MSs A-D 508-514 are operating in a same wireless coverage area of a same serving BS. Furthermore, MS A 508 may, for example, be the same or similar to MS 105 of FIG. 1, MS B 510 may, for example, be the same or similar to MS 109 of FIG. 1, MS C 512 may, for example, be the same or similar to MS 155 of FIG. 1, and MS D 514 may, for example, be the same or similar to MS 159 of FIG. 1.

In this example, the uplink data channel is a dedicated uplink data channel separate from uplink or downlink channel portions of a voice channel assigned to the active group call, while in other embodiments, the uplink channel portion of the active group voice channel could also be used as the uplink data channel during call hang time hold off periods. Furthermore, in this example, the MS provided an opportunity to transmit short data during a delayed call hang time (e.g., during a call hang time hold off period) is a member of the active group call, while in other embodiments, other MSs not part of the active group call may be provided the opportunity to transmit the short data as well.

As illustrated in FIG. 5, during time period 420 of an already-active group call, MS B 510 has its PTT input activated and is transmitting voice data to the second group on an uplink channel portion of the active group voice channel (only the downlink channel portion of which is shown in FIG. 5), and MSs A 508, C 512, and D 514 are all in a receive mode and receive the voice data transmitted by MS B 410 on the downlink channel portion of the active group voice channel 404 (accordingly identified as 'busy' during time period 420), decode the voice data, and playback the corresponding audio (accordingly identified as in a "Listen to B" state during time period 420).

Periodic or semi-periodic opportunities 422 and 428 for MS A 508 to transmit short data on the uplink data channel 502 are again illustrated in a shaded manner similar to FIG. 4. As shown in FIG. 5, MS A 508 cannot move to the uplink data channel 502 during the time period 420 or it would miss the portion of the voice data being transmitted by MS B 510 (and repeated on the downlink channel portion of the active group voice channel by a BS), and thus MS A 508 misses the first periodic or semi-periodic opportunity 422 to transmit short data.

Next, a user of MS B 510 releases or otherwise deactivates the PTT input and transmits an indication of the release on the uplink channel portion of the active group voice channel.

In this example, and instead of entering a call hang time period during time period 540 in response to receiving the indication of release of the PTT input by MS B 510, a radio controller in the system determines that MS A 508 missed the periodic or semi-periodic opportunity 422 (or for some other reason) and thus needs to transmit short data, and in response, transmits a call hang time hold off request message (not shown) to all of the MSs in the active group call on the downlink channel portion of the active group voice channel 504. The call hang time hold off request may itself instruct MS A 508 to switch to the uplink data channel 502 to transmit short data, or a subsequent message may do so. In any event, as a result of receiving the call hang time hold off request, and as illustrated in FIG. 5, MS B 510, MS C 512, and MS D 514 enter a "Hang Time Hold Off" state during time period 540 for a call hang time hold off period. While in the Hang Time Hold Off state, MSs previously in a receiving state (MS C 512 and MS D 514) continue to provide a visual indication on a display of the MS that it is in a receiving state of the active group call, and continues to disable the PTT activation input of the device, while MSs previously in a transmitting state (MS B 510) continue to provide a visual indication on a display of the MS that it is in a transmitting state of the active group call, and disables or otherwise ignores any further activation of the PTT input of the device. On the other hand, the MS provided with the opportunity to transmit short data during the call hang time hold off period (MS A 508) switches to the uplink data channel 502 and transmits short data in one or both of opportunities 542 and 544.

MS A 508 is indicated as a "priority subscriber" in the group and is assigned the opportunity to transmit short data during the call hang time hold off period perhaps to the exclusion of the other MSs MS B 510, MS C 512, and MS D 514, either one or more of which may also be in need to transmit short data due to the extended voice activity in the group. MS A 508 may be prioritised and granted the opportunities 542 and/or 544 because it is the one that has gone the longest without reporting short data (such as location or sensor information), because MS A 508 is associated with a prioritised user such as a commander or specialist, or for some other reason. In other embodiments, transmit opportunities may be randomly or pseudo-randomly assigned. In some embodiments, the duration of the call hang time hold off period may be preconfigured in all MSs or may be dynamically set by the infrastructure and provided to the MSs. In other embodiments, the duration of the call hang time hold off period may be variable and may not end until the MS assigned the opportunity transmits a success message to the radio controller in the infrastructure. In still further embodiments, the call hang time hold off request message may set the duration of the call hang time hold off period. Other possibilities exist as well.

After the call hang time hold off period expires and the MS A 508 assigned the opportunity to transmit the short data returns to the downlink channel portion of the active group voice channel 504, a normal call hang time period 424 begins, as previously illustrated with respect to FIG. 4. Because the call hang time hold off period prevents other MSs from responding to the previously transmitting MS V 510, the call hang time hold off period should be kept relatively short (e.g., under 1 or under 2 or 5 seconds) in order to refrain from substantially impeding on call performance. As a result, the short data is an amount of data less than or equal to a maximum amount of data that can be transmitted during a preconfigured maximum call hang time hold off period configured in the system, and the type of data allowed to be transmitted during the call hang time hold off period is restricted to short (e.g., small) amounts of data that may be incremental in nature, such as location information or sensor information. In one example, two uncompressed GPS location updates (e.g., approximately 20 bytes each) may be transmitted in a DMR system within approximately one second (assuming a 9.6 kbps gross bit rate), or fifteen compressed GPS location updates (e.g., approximately 10 bytes each) may be transmitted in a DMR system within approximately one second. Other variations are possible as well. The amount of sensor data capable of being transmitted within a similar threshold period of time may vary depending on the type and amount of sensor data to be transmitted. Other examples are possible as well.

At the beginning of time period 426, MS C 512 detects activation of its PTT input and switches to the uplink channel portion of the active group voice channel and begins transmitting voice data to the group, effectively ending the normal call hang time period. As during time period 420, the voice data transmitted by MS C 512 is repeated via its serving BS on the downlink channel portion of the active group voice channel 504, and MSs A 508, B 510, and D 514 are accordingly illustrated as in a "Listen to C" state and receive the voice data over the channel 504, decode the voice data, and play back corresponding audio. The downlink channel portion of the active group voice channel 504 is again illustrated as 'busy' during time period 426. As shown in FIG. 5, MS A 508 again cannot move to the uplink data channel 402 during the time period 426 or it would miss the portion of the voice data being transmitted by MS C 512, and thus MS A 508 misses the second periodic or semi-periodic opportunity 428 to transmit short data.

Next, a user of MS C 412 releases or otherwise deactivates the PTT input, and transmits an indication of the release on the uplink channel portion of the active group voice channel.

In this example, and instead of entering a call hang time during time period 540 in response to receiving the indication of release of the PTT input by MS C 512, a radio controller in the system determines that MS A 508 missed the periodic or semi-periodic opportunity 428 (or for some other reason) and thus needs to transmit short data. In response, the radio controller transmits a call hang time hold off request message (not shown) to all of the MSs in the active group call on the downlink channel portion of the active group voice channel 504. While in this example MS A 508 is again provided an opportunity to transmit short data, in other embodiments, any one of MSs B 510, C 512, D 514, or any other MS in the wireless communication system for that matter (not shown) may be provided the opportunity to transmit short data during the call hang time hold off period.

As during time period 540, during time period 550, as a result of receiving the call hang time hold off request, MS B 510, MS C 512, and MS D 514 again enter a "Hang Time Hold Off" state, which effectively becomes a second call hang time hold off period, and MSs A-D 508-514 behave in accordance with the descriptions already set forth above with respect to time period 540.

After the call hang time hold off period expires and the MS A 508 assigned the opportunity to transmit the short data returns to the downlink channel portion of the active group voice channel 504, a normal call hang time period begins which, as previously illustrated with respect to FIG. 4, is not shown in FIG. 5 as a user of MS D 514 substantially immediately activates its PTT input and MS D 514 switches to the uplink channel portion of the active group voice channel and begins transmitting to the group during time period 430, effectively ending the call hang time period too small to illustrate in FIG. 5. Similar to time period 420, the voice data transmitted by MS D 514 is then repeated via its serving BS on the downlink channel portion of the active group voice channel 504, and MSs A 508, B 510, and C 512 are accordingly illustrated as in a "Listen to D" state and receive the voice data over the channel 504, decode the voice data, and play back corresponding audio. The downlink channel portion of the active group voice channel 504 is again illustrated as 'busy' during time period 430.

Figure 6:
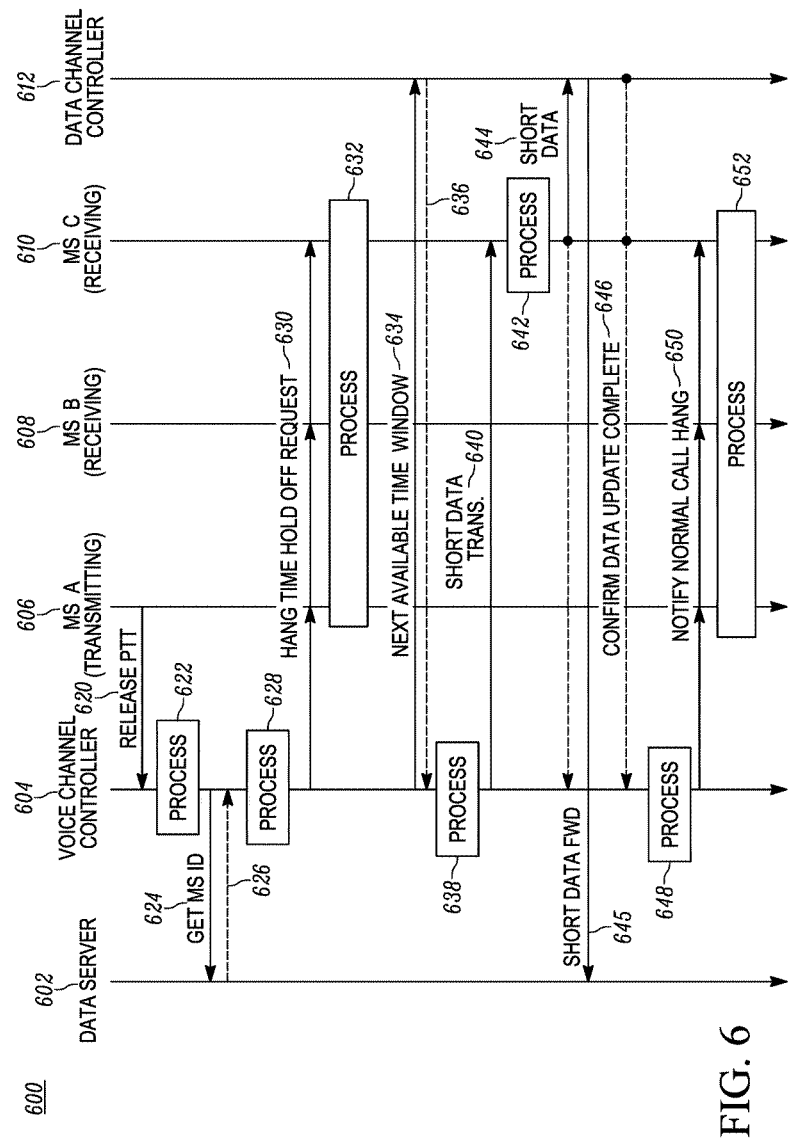
FIG. 6 is a ladder diagram illustrating a process for transmitting short data during a call hang time hold off period in accordance with an embodiment.

FIG. 6 is a ladder diagram 600 illustrating a process for transmitting short data during a call hang time hold off period in accordance with an embodiment. The ladder diagram of FIG. 6 illustrates message transmissions and receptions, and processing tasks, executed across a data server 602, a voice channel controller 604, a MS A 606, a MS B 608, a MS C 610, and a data channel controller 612. The data server 602 may be the same or similar to the data server 123, and may, for example, provide storage or application functionality around location or sensor information. The voice channel controller 604 may be the same or similar to radio controller 121, and controls an uplink channel portion of an active group voice channel and a downlink channel portion of an active group voice channel for group voice communications between MSs A-C 606-610 that form a group of radios (e.g., that are all associated with and/or subscribed to a particular group having a particular group ID). The voice channel controller 604 may be associated with a conventional FDMA or TDMA voice channel assigned to the group, or a trunked FDMA or TDMA voice channel assigned to the group for the particular group call. MSs A-C 606-610 may be the same or similar to MSs 105, 109, 155 of FIG. 1 and/or MSs A 508, B 510, and C 512 of FIG. 5 and are capable of transmitting and receiving voice data over a voice channel associated with voice channel controller 604 and at least one MS is in need of transmitting periodic or semi-periodic short data. Data channel controller 612 may be the same or similar to radio controller 121, may be the same or separate device as voice channel controller 604, and in embodiments where the voice channel associated with voice channel controller 604 is used to transmit short data during a call hang time hold off period, may not be necessary and therefore not present at all. A data channel associated with data channel controller 612 may be, in some embodiments, a dedicated data revert channel available to MSs in a wireless communication system for transmitting short data to the infrastructure, and may be an FDMA or TDMA channel, among other possibilities.

Although a particular order of transmissions and steps is indicated in FIG. 6 for ease of illustration, many of the processing steps, message transmissions, and message receptions illustrated in FIG. 6 could occur in different orders and/or could occur in parallel, and the particular order of steps in FIG. 6 is thus exemplary in nature and should not be used to limit potential variations in ordering or timing.

The example process set forth in FIG. 6 for transmitting short data during a call hang time hold off period begins with MS A 606, during an already-active call to a group that includes MSs A-C 606-610 and in which MS A 606 is the initiator/current transmitter for the group call, detecting a release or deactivation of MS A's 606 PTT input and responsively transmitting a Release PTT message 620 to the infrastructure via an assigned voice channel associated with voice channel controller 604. At step 622, the voice channel controller 604 processes the Release PTT message 620 and determines if any MSs in the group, or in some embodiments any MSs in the wireless communication system in which it operates or that it has control over, have a need to transmit short data. Determining that a MS in the group or in the system has a need to transmit short data may include determining that the MS missed a scheduled opportunity to transmit short data as explained above with respect to FIG. 4, determining a threshold period of time has passed since a last time the MS has reported a particular type of short data (e.g., where the threshold period of time may vary based on the type of short data, such as location or sensor data), receiving a request for location data from the MS from another device in the infrastructure or another MS in the system, or based on some other event or determination.

In some embodiments, the voice channel controller 604 may make the determination of whether any MSs in the group or system have a need to transmit short data in coordination with one or more data servers such as data server 602. More specifically, in some embodiments, processing step 622 may merely involve processing the Release PTT message 620 and subsequently querying one or more data servers to determine whether any data servers or applications running on such data servers are in need of short data from one or more MSs in the group or system. As illustrated via example in FIG. 6, voice channel controller 604 queries data server 602 in a Get MS ID message 624. The Get MS ID message 624 may request that the receiving data server 602 identify which MSs, if any, are in need of transmitting short data. The response message 626 may then identify one or more such MSs in need, may identify only a highest priority MS in need, or may identify a plurality of MSs in need and include corresponding priority information or other information for use by the voice channel controller 604 in determining which one or more MSs to grant an opportunity to transmit short data during the call hang time hold off period associated with the active group call.

At step 628, the voice channel controller 604 processes the response message 626 and identifies one or more MSs to grant an opportunity to transmit short data to during the call hang time hold off period. The number of MSs to grant such an opportunity to may depend on the type of data expected or requested to be transmitted by the MSs, and a preconfigured amount of time available during the call hang time hold off period. For example, if a maximum amount of time available for the call hang time hold off period in the system is 1 second, and the type of data to be transmitted is sensor data that the voice channel controller expects can be transmitted in less than 500 ms, two MSs may be provided an opportunity to transmit during the call hang time hold off period. In the example of FIG. 6, it is assumed that only a single short data transmission can be transmitted during the call hang time hold off period, so that only a single MS is identified at step 628 (in this case, MS C 610) to be given the opportunity to transmit short data during the call hang time hold off period.

Next, the voice channel controller 604 causes a Hang Time Hold Off Request message 630 to be transmitted on the downlink channel portion of the voice channel with which it is associated, for receipt by MSs A-C 606-610. The Hang Time Hold Off Request message 630 is a message that instructs the receiving MSs to refrain from transmitting or receiving any further voice data over the voice channel and to continue to disable or otherwise refrain from processing any PTT activations detected at the MS.

At step 632, all MSs in the group receive and process the Hang Time Hold Off Request message 630 (including the previously transmitting MS A 606, which switched to the downlink channel portion of the active group voice channel after transmitting the Release PTT message 622 on the uplink channel portion of the active group voice channel) at step 632. For a MS that was previously transmitting during the active group call, which in this example is MS A 606, the Hang Time Hold Off Request message 630 instructs (or receipt of the Hang Time Hold Off Request message 630 causes) the MS A 606 to continue to maintain a display indicating that the active call is in progress and the MS is in a transmitting state during the call hang time hold off period (even though, as noted above, the MS A 606 has already switched to the downlink channel portion of the active group voice channel). For MSs that were previously receiving during the active group call, which in this case is MSs B 608 and C 610, the Hang Time Hold Off Request message 630 instructs (or receipt of the Hang Time Hold Off Request message 630 causes) the MS B 608 and C 610 to continue to maintain a display indicating that the active call is in progress and the MS is in a receiving state.

In some embodiments, the Hang Time Hold Off Request message 630 instructs (or receipt of the Hang Time Hold Off Request message 630 causes) the receiving MSs to refrain from entering a normal call hang time state (and thus re enabling the PTT input) until a subsequent normal call hang time resume message is received. In other embodiments, the Hang Time Hold Off Request message 630 instructs (or receipt of the Hang Time Hold Off Request message 630 causes) the receiving MSs to refrain from entering a normal call hang time state (and thus re-enabling the PTT input) for an amount of time specified in the Hang Time Hold Off Request message 630, specified in a code plug or otherwise pre-configured at the MSs, or specified in some other associated message.

Figure 7:
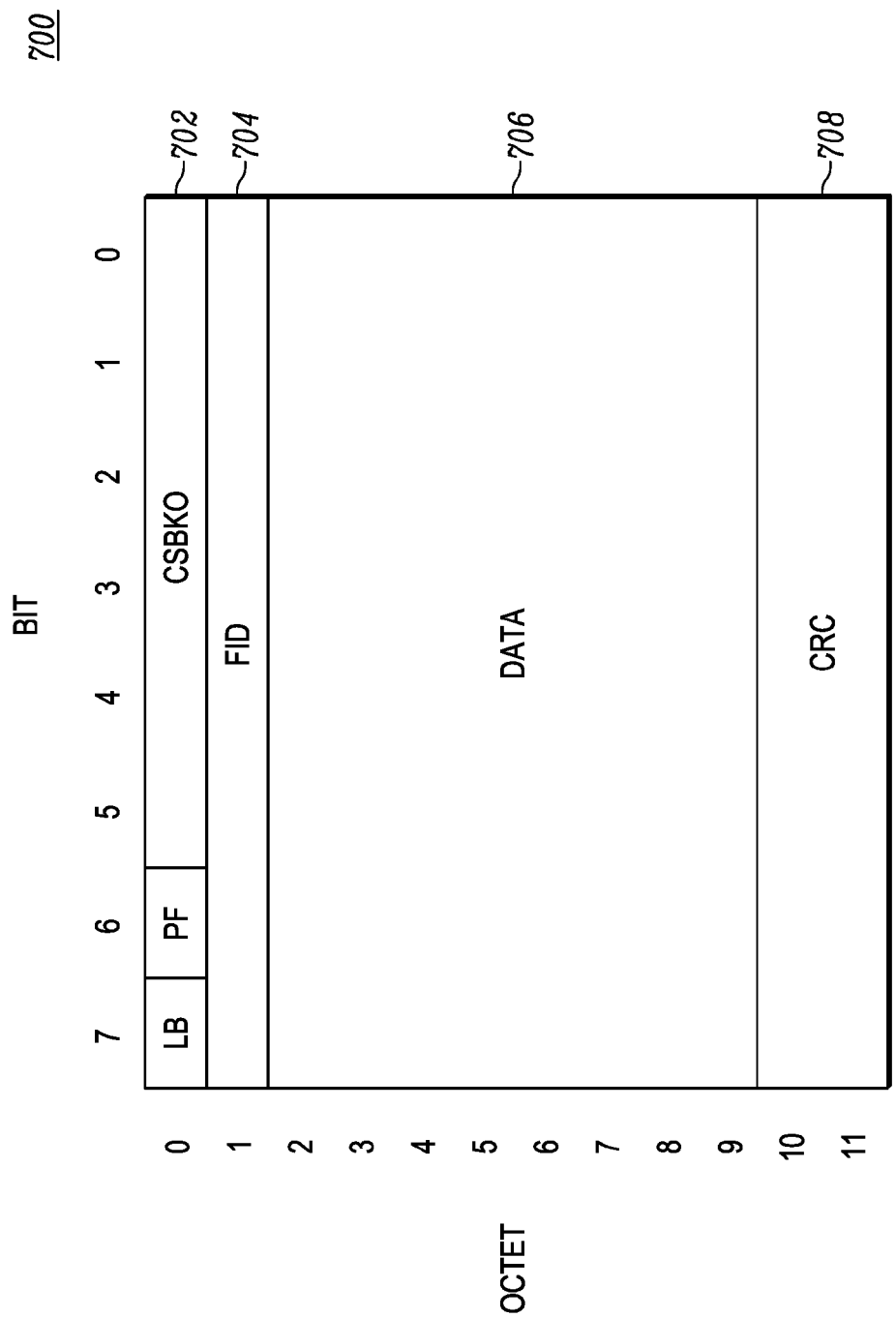
FIG. 7 is a block diagram of an example control signalling block (CSBK) that may be used to signal a beginning or end of a call hang time hold off period or that may be used to instruct a mobile station to transmit short data during the call hang time hold off period, in accordance with an embodiment.

FIG. 7 provides an example block diagram of a message structure 700 of various messages transmitted in FIG. 6, including one which may be used for the Hang Time Hold Off Request message 630, in accordance with an embodiment. The message structure 700 may be compliant with the DMR standard control signalling block (CSBK) structure, and may comprise 12 octets numbered 0-11. Octet 0 702 includes last block (LB), protect flag (PF), and CSBK Opcode (CSBKO) fields. Octet 1 704 includes a feature ID (FID) field. In this example, the CSBKO field may be set to a proprietary value that identifies the message as a Hang Time Hold Off Request message 630.

The FID field may be set to a proprietary value associated with a particular manufacturer feature set that includes the delayed call hang time feature discussed herein. Octets 2-9 set forth a Data field 706. The Data field 706 in this case may include an MS ID field that takes up octets 2-4 and identifies the target MS that will be granted an opportunity to transmit short data. In other embodiments, octets 2-4 may be set to a 0 or null value, or may simply be ignored or discarded by receiving MSs. Octets 5-7 of the Data field 706 in this case may set forth a group ID that identifies the target group of the Hang Time Hold Off Request message 630, which is the group that includes MSs A-C 606-610. The remaining octets 8-9 of the Data field 706 are reserved. The cyclic-redundancy-check (CRC) field 708 includes a CRC value for use by receiving MSs in verifying that the message 700 has been received in an error-free state. In some embodiments, octets 2-4 and/or 8-9 may be used to specify a time window that identifies a duration of the call hang time hold off period.

Returning to FIG. 6, in embodiments in which a data revert channel or otherwise different channel than the voice channel is provided on which to transmit short data, the voice channel controller 604 next transmits a Next Available Time Window request message 634 to the data channel controller 612. In embodiments in which a plurality of MSs were identified by the voice channel controller 604, the Next Available Time Window request message 634 may request a corresponding plurality of next available time windows on the data channel.

The data channel controller 612 then responds with an identity of a next available time window (or time windows) on the data channel in which the MS (or MSs) identified by the voice channel controller may transmit short data in response message 636. The response message 636 may identify the next available time window via an absolute time identifier, a time offset relative to a time at which the response message 636 is sent, or via some other method. At step 638, the voice channel controller 604 processes the response message 636 and then generates and transmits same or separate Short Data Transmission request message(s) 640 to the MS or MSs previously identified for short data transmit opportunities. The Short Data Transmission request message 640 includes the ID(s) of the MS(s) identified by the voice channel controller 604 and the identity of the next available time window at which to transmit pending short data on the data channel. In the example set forth in FIG. 6, the Short Data Transmission request message 640 includes the MS ID of MS C 610 and identifies a window on the data channel associated with data channel controller 612 for MS C 610 to transmit short data on.

The Short Data Transmission request message 640 may use a same or similar message structure 700 as that set forth above with respect to the Hang Time Hold Off Request message 630, with several exceptions. For example, the Short Data Transmission request message 640 would include a different CSKBO that identifies the message as a Short Data Transmission request message 640. Furthermore, octets 2-4 of the message would necessarily need to identify at least one MS to transmit short data on the assigned data channel, if it was not previously included in the Hang Time Hold Off Request message 630. In some embodiments, the identity of the assigned data channel may be pre-configured in the MSs. In other embodiments, octets 8-9 of the Short Data Transmission request message 640, or a portion of some other message, may identify the assigned data channel, which may include a separate data revert channel such as the data channel associated with data channel controller 612 or the uplink channel portion of the active group voice channel associated with voice channel controller 604, among other possibilities. Octets 5-7 may similarly set forth a group ID that identifies the target group of the Short Data Transmission request message 640, which in this case is the same group that includes MSs A-C 606-610.

At step 642 of FIG. 6, the MS C 610 identified in the Short Data Transmission request message 640 (or in the Hang Time Hold Off Request message 630) receives and processes the message, extracts the next window identity information from the message (or based on the timing of receipt of the message), and immediately or at a corresponding time, switches to the data channel and transmits a Short Data message 644 via the data channel and data channel controller 612. The data channel controller 612 receives the short data and forwards it on to its destination, which in this case is data server 602 via short data fwd message 645. Subsequently, one or both of the MS C 610 and the data channel controller 612 confirms that the short data transmission has been completed via a Confirm Data Update Complete message 646 transmitted on a respective one of the uplink channel portion of the active group voice channel and a backhaul connection between the data channel controller 612 and the voice channel controller 604.

Various additional modifications may be made to the timing and message contents of the ladder diagram 600 of FIG. 6 while still realizing the disclosed benefits of the embodiments set forth herein. As just one example, in an embodiment in which the data channel controller 612 is not used or is not present, and as indicated via the dashed line of the Short Data 644 pointing the opposite way of the data channel controller 612, the Short Data may be transmitted on the uplink channel portion of the active group voice channel instead of the separate data channel. In this case, the messages 634, 636 between the voice channel controller 604 and the data channel controller 612 would similarly be eliminated, and the voice channel controller 604 would itself identify the next available time window on the uplink channel portion of the active group voice channel and include or indicate such information in the Hang Time Hold Off request message 630 or the Short Data Transmission request message 640. Furthermore, the Short Data fwd message 645 would then take place between the voice channel controller 604 and the data server 602.

Returning to the main example illustrated in FIG. 6, at step 648, the voice channel controller 604 processes the Confirm Data Update Complete message 646, and in response, transmits a Notify Normal Call Hang message 650 instructing the MSs A-C 606-610 of the active group to transition to a normal call hang time.

The Notify Normal Call Hang message 650 may be a DMR standard compliant voice terminator message, or may be another proprietary message having a similar message structure 700 as the Short Data Transmission request message 640 and/or Hang Time Hold Off Request message 630, with commensurate changes to the CSBKO field to identify the message as a normal call hang time resume or voice terminator message and the octets 5-7 of the Data field 706 set to the group ID that identifies the target group of the Notify Normal Call Hang message 650, which in this case is the same group that includes MSs A-C 606-610.

As another alternative variation, in embodiments in which the Hang Time Hold Off Request message 630 indicated a time period for the call hang time hold off period, the Notify Normal Call Hang message 650 may not be sent, and the line 650 may merely represent an expiration of the time period indicated in the Hang Time Hold Off Request message 630 instead of the transmission of a separate message, after which the processing at step 652 remains substantially the same (except that the processing 652 is triggered by expiration of a time period instead of receipt of the Notify Normal Call Hang message 650).

At step 652, the MSs A-C 606-610 receive and process the Notify Normal Call Hang message 650 or otherwise detect an expiration of the call hang time hold off period and, in response, re-enable the PTT input or otherwise resume responding to activations of the PTT input so that MSs in the group can now assume transmit status and reply back to MS A 606, if desired. The normal call hang time proceeds for the system configured amount of time, and if none of MSs A-C 606-610 key up during that time, the call hang time will expire for the voice channel and a channel hang time begins, during which time the voice channel associated with voice channel controller 604 is no longer reserved for MSs associated with the previously active group. Instead, during channel hang time, the voice channel is opened up for use by other MSs and/or groups in the system (in a conventional system) or returned to the pool of available traffic channels (in a trunked system).

Figure 8:
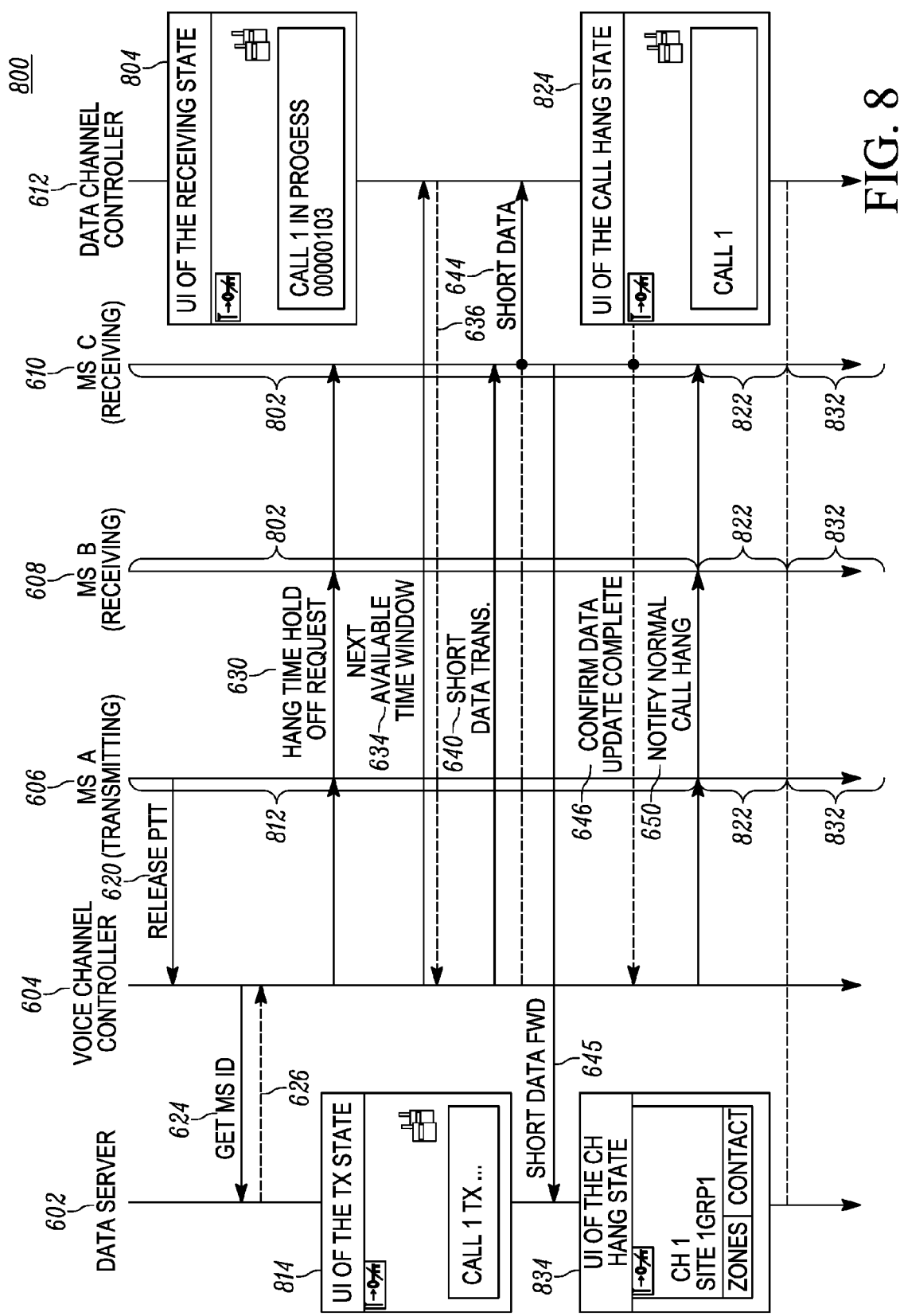
FIG. 8 is a ladder diagram illustrating user interface states of mobile stations for facilitating the process of FIG. 6 in accordance with an embodiment.

FIG. 8 sets forth a substantially duplicative ladder diagram 800 as already set forth and described above with respect to FIG. 6, but is modified to include examples of MS display modifications at MSs in the active group. In the ladder diagram 800, all processing steps of FIG. 6 are removed for ease of illustration purposes only, and all message sequences retain their same reference characters from FIG. 6. As show in FIG. 8, during a time period from before an MS A 606 user releases or otherwise deactivates MS A's 606 PTT input to a time at which the Notify Normal Call Hang message 650 is sent, the displays of the MSs in the group do not change from the time before the PTT release until a time after which the short data is either completed or the call hang time hold off period otherwise expires. For example, during time period 812, the initiating/transmitting device MS A's 606 display 814 continues to indicate that it remains in a transmitting state even though its user has released or otherwise deactivated the PTT input and MS A 606 has switched its transceiver to the downlink channel portion of the voice channel associated with voice channel controller 604. Similarly, during time period 812, the receiving devices MS B's 608 and MS C's 610 displays 804 continue to indicate that each remains in a receiving state even though the initiating/transmitting MS A 606 has released or otherwise deactivated its PTT input and they are no longer receiving voice data from MS A 600 and even though MS C 610 switches to a data channel to transmit a short data update.

During time period 822, after the Notify Normal Call Hang message 650 is received at each of the MSs A-C 606-610, the displays at each MS changes to indicate a normal call hang time state 824, a state in which a user may now transition to a transmitting state by activating a PTT input and talking back to other member MSs in the group. During time period 832 after expiration of the normal call hang time period indicated by time period 822, the displays at each MS changes to indicate a channel hang state 834, a state in which a user may now transition to a transmitting state by activating a PTT input and transmitting voice data to other member MSs in its group, but during which the voice channel is no longer reserved for members of the previously active group. In other words, during time period 832, each MS 606-610 must now contest for a voice channel with any other MSs and/or groups in the wireless communication system in which they operate.

III. CONCLUSION

In accordance with the foregoing, an improved method, apparatus, and system for transmitting short data during a delayed call hang time period in a wireless communication system is disclosed. As a result, MSs in groups experiencing high voice activity are still able to make periodic or semi-periodic transmissions of data, preventing infrastructure applications relying upon such data from being starved of information that may be critical to the safety and well-being of MS users. Other advantages and benefits are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of transmitting short data during a call hang time hold off period in a wireless communication system, wherein call hang time is a time period in which the voice channel is no longer carrying any voice data from or to any of the mobile stations that were in the active call but during which it is reserved for use only by the active mobile stations that were in the active call to end the call hang time by transmitting, the method comprising:
   during an active call on a voice channel, detecting, at a radio controller, deactivation of a push-to-talk (PTT) input at a transmitting mobile station via an uplink channel portion of the voice channel, identifying a particular mobile station in the wireless communication system in need to transmit short data, and responsively:
   causing, by the radio controller, a call hang time hold off request to be transmitted via a downlink channel portion of the voice channel to all mobile stations in the active call instructing the mobile stations to delay call hang time for the active call during a call hang time hold off period; and
   causing, by the radio controller, a short data transmission request to be sent to the particular mobile station instructing the particular mobile station to transmit inbound short data during the call hang time hold off period.

2. The method of claim 1, further comprising causing, by the radio controller, a normal call hang time resume message to be sent to all mobile stations in the active call instructing the mobile stations to resume call hang time for the active call.

3. The method of claim 1, wherein the call hang time hold off request indicates one of a length of time of said call hang time hold off period or an end time of said call hang time hold off period, after which time a hang time for the active call resumes.

4. The method of claim 1, wherein the short data transmission request identifies the uplink channel portion of the voice channel as a data channel on which to transmit the short data.

5. The method of claim 1, wherein the short data transmission request identifies a data uplink channel different from the uplink channel of the voice channel as a data channel on which to transmit the short data.

6. The method of claim 1, wherein the step of causing the short data transmission request to be sent to the particular mobile station is performed responsive to identifying a next available data transmission window on one of the uplink channel portion of the voice channel and a data uplink channel different from the uplink channel portion of the voice channel, the short data transmission request identifying the next available data transmission window.

7. The method of claim 2, wherein the step of causing the normal hang time resume message to be sent to all mobile stations in the active call is performed responsive to receiving confirmation that the short data transmission was completed.

8. The method of claim 1, wherein the short data is one of a location update of the particular mobile station and sensor data associated with a user of the particular mobile station.

9. The method of claim 1, wherein identifying the particular mobile station comprises prioritizing a plurality of mobile stations in need of transmitting short data and selecting the particular mobile station as a highest priority mobile station out of the plurality of mobile stations.

10. The method of claim 9, wherein the particular mobile station is selected as the highest priority mobile station due to a determination that the particular mobile station has failed to update its location or provide sensor information of a user for a longest period of time.

11. The method of claim 9, wherein the particular mobile station is selected as the highest priority mobile station due to a determination that the particular mobile station is associated with a highest priority user type.

12. A radio controller in a radio network, the radio controller comprising:
a transceiver;
a processor; and
a computer readable medium having instructions stored thereon that, in response to execution by the processor, cause the radio controller to perform operations comprising:
during an active call on a voice channel, detecting deactivation of a push-to-talk (PTT) input at a transmitting mobile station via an uplink channel portion of the voice channel, identifying a particular mobile station in the wireless communication system in need to transmit short data, and
responsively:
causing, via the transceiver, a call hang time hold off request to be transmitted via a downlink channel portion of the voice channel to all mobile stations in the active call instructing the mobile stations to delay call hang time for the active call during a call hang time hold off period, wherein call hang time is a time period in which the voice channel is no longer carrying any voice data from or to any of the mobile stations that were in the active call but during which it is reserved for use only by the active mobile stations that were in the active call to end the call hang time by transmitting; and
causing, via the transceiver, a short data transmission request to be sent to the particular mobile station instructing the particular mobile station to transmit inbound short data during the call hang time hold off period.

13. A mobile station in a wireless communication system, the mobile station comprising:
a transceiver;
a push-to-talk (PTT) input;
a display;
a speaker;
a microphone;
a processor; and
a computer readable medium having instructions stored thereon that, in response to execution by the processor, cause the mobile station to perform a set of operations comprising:
during an active call on a voice channel, receiving, via the transceiver and a downlink channel portion of the voice channel, a call hang time hold off request instructing mobile stations participating in the active call to delay call hang time for the active call during a call hang time hold off period, wherein call hang time is a time period in which the voice channel is no longer carrying any voice data from or to any of the mobile stations that were in the active call but during which it is reserved for use only by the active mobile stations that were in the active call to end the call hang time by transmitting;
during the call hang time hold off period, refraining from acting upon any detected activation of the PTT input;
subsequently receiving, via the transceiver and a downlink channel portion of the voice channel, a normal call hang time resume message sent to all mobile stations in the active call instructing the mobile stations to refrain from further delaying call hang time for the active call; and
responsive to detecting an activation of the PTT input during call hang time after receiving the normal call hang time resume message, transmitting, via an uplink channel portion of the voice channel, a request to transmit.

14. The mobile station of claim 13, further comprising:
receiving, via the transceiver and a downlink channel portion of the voice channel, and prior to receiving the call hang time hold off request, voice data, decoding the voice data, and playing back, via the speaker, audio corresponding to the voice data.

15. The mobile station of claim 14, further comprising:
during the call hang time hold off period, maintaining a display of the mobile station to continue to indicate that the active call is in progress and the mobile station is in a receiving state, and only after receiving the normal call hang time resume message, transitioning the display to indicate a call hang time state.

16. The mobile station of claim 13, further comprising:
prior to receiving the call hang time hold off request, receiving, via the microphone, input audio, vocoding the input audio, and transmitting, via the transceiver, corresponding voice data via an uplink channel portion of the voice channel; and
after detecting a release of the PTT input but prior to receiving the call hang time hold off request, transmitting a PTT release message on the uplink channel portion of the voice channel and then switching the transceiver from the uplink channel portion of the voice channel to the downlink channel portion of the voice channel.

17. The mobile station of claim 16, further comprising:
during the call hang time hold off period, maintaining a display of the mobile station to continue to indicate that the active call is in progress and the mobile station is in a transmitting state, and only after receiving the normal call hang time resume message, transitioning the display to indicate a call hang time state.

18. The mobile station of claim 13, further comprising during the call hang time hold off period, refraining from transmitting or receiving voice data on the voice channel of the active call.

19. The mobile station of claim 13, further comprising during the call hang time hold off period:

switching the transceiver to a data uplink channel and transmitting, via the transceiver, pending short data on a data uplink channel; and subsequently switching the transceiver to the downlink channel portion of the voice channel.

* * * * *